United States Patent [19]

Ohyanagi et al.

[11] Patent Number: 5,039,985

[45] Date of Patent: Aug. 13, 1991

[54] PAGING APPARATUS WITH IMPROVED MESSAGE DISPLAY FUNCTION

[75] Inventors: Shihoko Ohyanagi; Kiyoshi Wagai; Mitsuji Shiono, all of Tokyo, Japan

[73] Assignee: Kabushiki Kaisha Toshiba, Kawasaki, Japan

[21] Appl. No.: 336,074

[22] Filed: Apr. 11, 1989

[30] Foreign Application Priority Data

Apr. 26, 1988 [JP] Japan ........................ 63-103519

[51] Int. Cl.[5] ........................ H04Q 9/00

[52] U.S. Cl. ........................ 340/825.44; 340/825.48

[58] Field of Search ........................ 340/825.44, 825.48, 340/311.1; 455/343, 347, 351, 67; 371/24

[56] References Cited

U.S. PATENT DOCUMENTS

| | | | |
|---|---|---|---|
| 4,599,615 | 7/1986 | Umetsu | 340/825.44 |
| 4,649,538 | 3/1987 | DeLuca et al. | 371/24 |
| 4,720,710 | 1/1988 | Akahori et al. | 340/825.44 |
| 4,910,511 | 3/1990 | Nagata et al. | 340/825.44 |

FOREIGN PATENT DOCUMENTS

| | | | |
|---|---|---|---|
| 0136677 | 4/1985 | European Pat. Off. | 340/825.44 |

*Primary Examiner*—Donald J. Yusko
*Assistant Examiner*—Edwin C. Holloway, III
*Attorney, Agent, or Firm*—Banner, Birch, McKie & Beckett

[57] ABSTRACT

A paging apparatus having a message display function in which one or more of the messages stored in a message memory may be erased in response to the operation of a test switch in the factory during manufacturing. The paging apparatus is of a type that does not include a power switch. Rather, power is supplied immediately upon connection of a battery. Accordingly, a test switch which is inaccessible to the normal user is provided to switch the operation of the paging apparatus from a normal mode to a test mode or vice versa.

6 Claims, 3 Drawing Sheets

PAGING APPARATUS WITH IMPROVED MESSAGE DISPLAY FUNCTION

FIELD OF THE INVENTION

This invention relates to a paging apparatus which receives paging signals broadcast from a base station, and more specifically to a paging apparatus without a power switch having message display functions.

DESCRIPTION OF THE RELEVANT ART

Recently, new types of pager systems have been developed wherein paging notification is effected by displaying a message in addition to an audible tone and a visual indication. As shown in FIG. 1, a single frame of a paging signal is time divided into a plurality of group signals (n groups in the Figure) and each group signal is further time divided into a synchronization word and a plurality of paging words (m words in the Figure). Each paging word includes an identification number code for the pager being paged and a message code.

In a conventional paging apparatus of the above type, intermittent reception occurs in synchronization with the synchronization word so that the paging apparatus receives only group signals addressed to the particular paging apparatus. During this intermittent reception, if the paging apparatus detects a group signal including an identification number code corresponding to the identification number code of the paging apparatus, the paging apparatus generates an audible or visual alarm (or both) and decodes the message code transmitted from the base station. The decoded message is displayed on a liquid crystal display. Also, the paging apparatus is equipped with a memory for storing the message. The stored message may be read out as required by a user so that the message can be redisplayed and confirmed on the liquid crystal display.

Furthermore, in recently developed paging apparatus, in order to further simplify and reduce the size of the paging apparatus, no power switch is used. The power supply of the paging apparatus is turned on and off by connecting and disconnecting the battery.

In paging apparatus without a power switch, in addition to the normal operational mode, a test mode is provided for testing the paging apparatus in the factory during manufacturing. In the test mode, an identification number code for the paging apparatus and message codes are continuously broadcast from a test transmission device for simulating operation of the paging apparatus. The intermittent receiving action described above is suspended during the test mode and the paging apparatus is set to a continual receiving operation state. Accordingly, the paging apparatus receives paging signals from the test transmission device and subsequently generates alarm signals and displays messages from the test transmission device. In this way, it is possible to confirm whether the audible alarm tone is properly generated and whether the message is correctly displayed and stored. Thus, it is possible to test whether the paging apparatus is operating correctly.

However, in a paging apparatus of the above type (i.e., paging apparatus without a power switch), in order to erase the messages stored in the memory, it is necessary to temporarily remove the battery from the battery holder and remount it again. These steps are necessary to turn off the power supply to the paging apparatus due to the absence of a power switch. Accordingly, when the test mode begins and a new test message is transmitted, the operation of removing and remounting the battery must be performed in order to erase the data already stored in the memory. This operation takes time and is troublesome so that the test cannot be carried out efficiently.

SUMMARY OF THE INVENTION

It is accordingly an object of the present invention to provide an improved paging apparatus for which an operational test can be efficiently carried out.

It is a further object of the present invention to provide an improved paging apparatus in which the memory for storing messages can be cleared without removing and remounting the battery thereof.

According to the present invention, a paging apparatus is provided which is capable of receiving a paging signal having an identification number code and a message. A control circuit determines whether the identification number code of the paging signal matches the identification number code stored in the paging apparatus, and if so, an audible and/or visual alarm is actuated and the message is displayed by an LCD. The control circuit includes a message memory for storing the message for subsequent display. The paging apparatus further includes a manually operable test switch which is inaccessible to the normal user and is generally used in the factory during manufacturing to test the operation of the paging apparatus. When the manually operable test switch is actuated, the message stored in the message memory is erased. Therefore, during testing of the paging apparatus, to erase the contents of the message memory, a test operator only operates the manually operable test switch without removing and remounting the battery. Also, the manually operable test switch may serve as a change-over switch for changing the operational modes of the paging apparatus.

DETAILED DESCRIPTION OF THE PREFERRED EMBODIMENT

Figure 1:
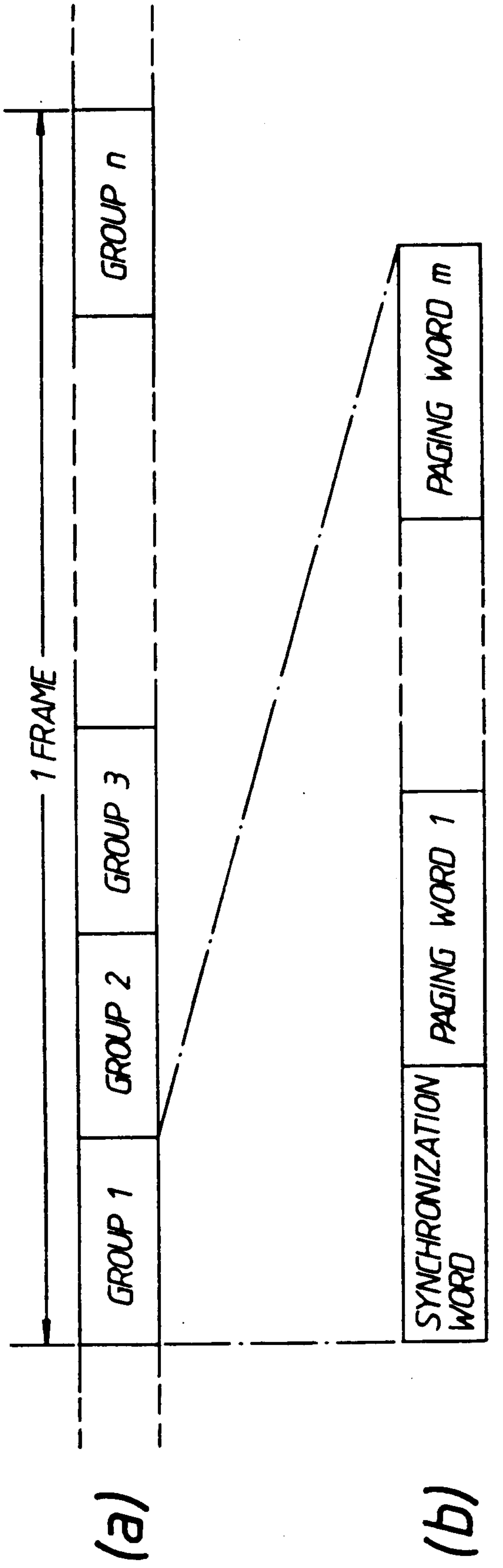
Fig.1. (PRIOR ART)
FIGS. 1(*a*) and 1(*b*) are diagrams showing data formats used in a conventional paging system.
Figure 2:
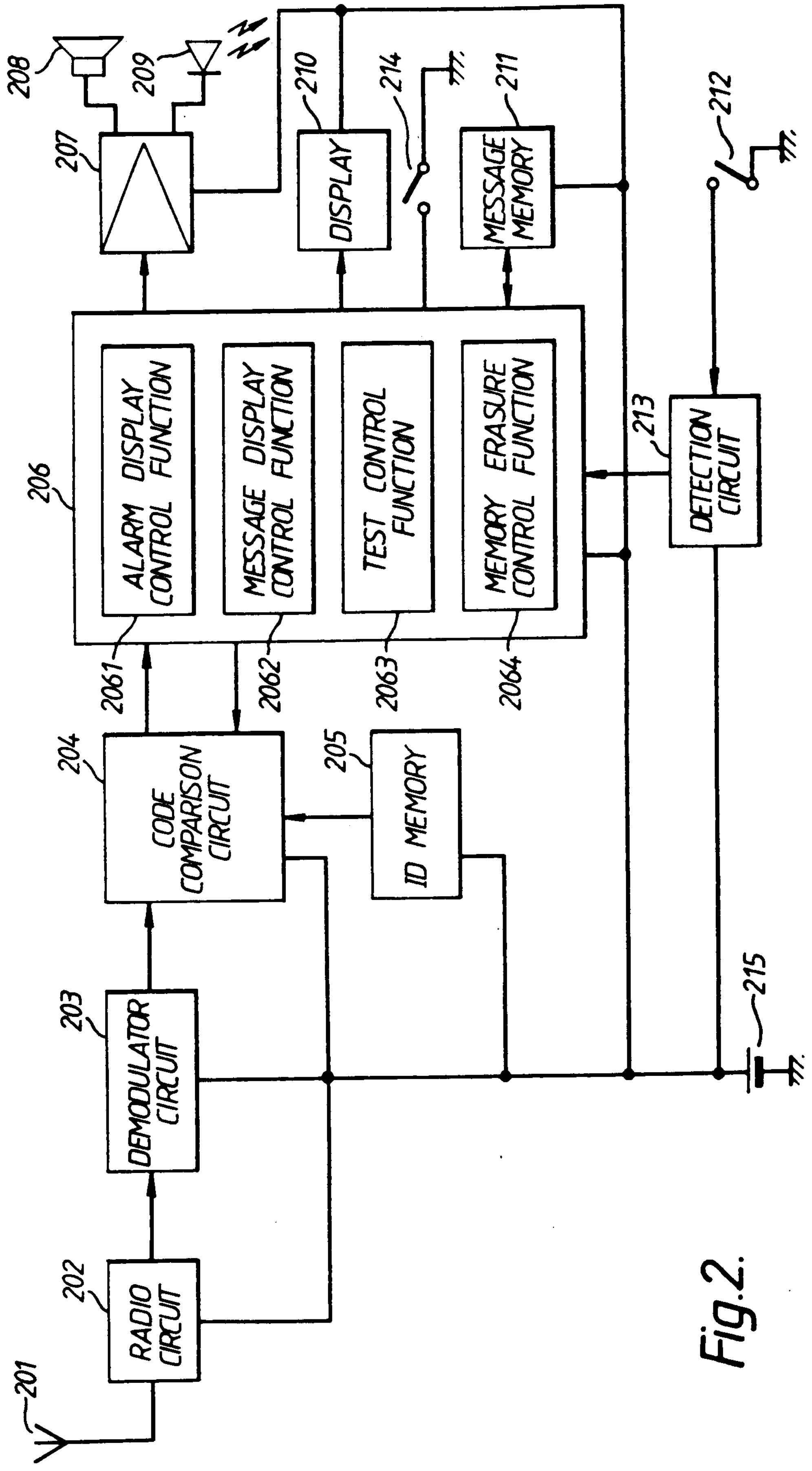
FIG. 2 is a block diagram showing an arrangement of a paging apparatus according to an embodiment of this invention.

FIG. 2 is a block diagram showing an arrangement of a paging apparatus according to an embodiment of this invention. In the paging apparatus of this embodiment, a paging signal sent from a base station (not shown) is received by antenna 201 and radio circuit 202. The received paging signal is demodulated by demodulator circuit 203, and the identification number codes and the message codes contained therein are regenerated. The identification number codes and message codes are fed to code comparison circuit 204. Code comparison circuit 204 compares the received identification number code with an identification number code read from ID memory 205. If the two codes match, a match signal is supplied to control circuit 206.

In the preferred embodiment, control circuit 206 is a microprocessor capable of performing an alarm display control function 2061, a message display control function 2062, a test control function 2063 and a memory erasure control function 2064. When the match signal is applied to control circuit 206, an alarm signal is generated by alarm display control function 2061 and supplied to speaker 208 and light emitting diode 209 through amplifier circuit 207. An alarm tone is produced by speaker 208 and a flashing light is produced by light emitting diode 209 to notify a user of the paging apparatus that a paging signal has been received. The message display control function 2062 of control circuit 206 decodes the received message code and supplies the message to display 210 consisting of a liquid crystal device. Also, the received message code is stored in message memory 211 consisting of RAM under control of message display control function 2062.

The paging apparatus further comprises manually operable test switch 212 and detection circuit 213. Test switch 212 is inaccessible to the normal user and is generally used in the factory during manufacturing to test the operation of the paging apparatus. Detection circuit 213 detects the state of test switch 212 and supplies a detection signal to control circuit 206. The test control function 2063 of control circuit 206 sets the paging apparatus to the test mode when the detection signal is supplied by detection circuit 213. Thereafter, a prescribed test operation is executed until the test mode is terminated. Upon each actuation of test switch 212, a detection signal is supplied to control circuit 206 by detection circuit 213, and all message codes previously stored in message memory 211 are erased under control of memory erasure control function 2064 of control circuit 206.

Each component of the paging apparatus is powered by battery 215. Power is supplied from battery 215 upon mounting battery 215 in the paging apparatus. Battery 215 is removable from the paging apparatus.

Figure 3:
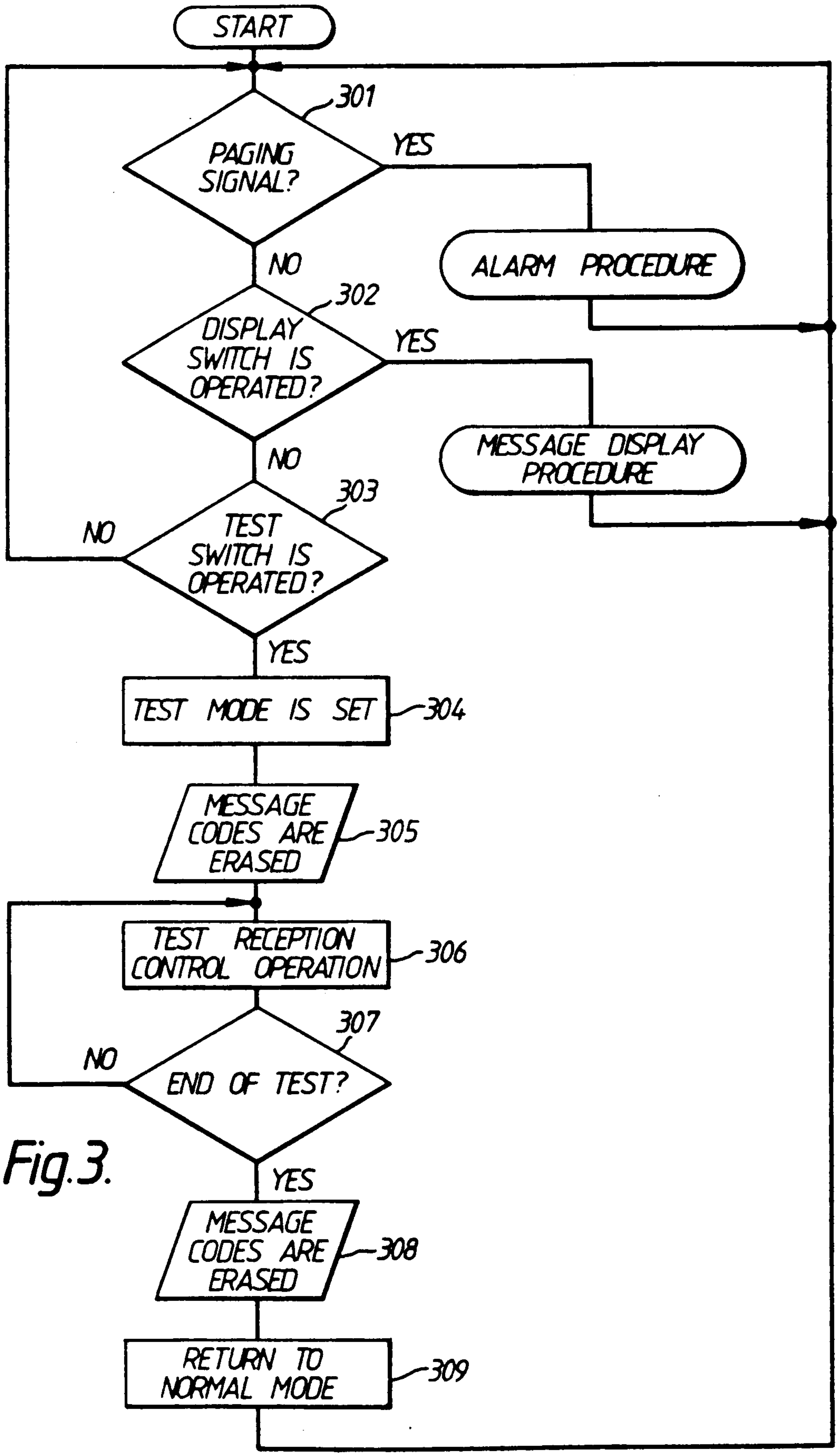
FIG. 3 is a flow chart explaining operation of the paging apparatus shown in FIG. 2.

The operation of a paging apparatus arranged as described above is described with reference to the flow diagram for control circuit 206 shown in FIG. 3. In a standby state, the paging apparatus repetitively monitors received paging signals (step 301), monitors the position of display switch 214 (step 302), and monitors the position of test switch 212 (step 303). In the standby state, a message stored in message memory 211 is erased when a new message is received and stored in message memory 211. The message stored in message memory 211 also may be erased at a regular predetermined time interval.

In the event test switch 212 is switched from the normal mode to the test mode using a test jig or the like in the factory during manufacturing, detection circuit 213 generates a detection signal and supplies the signal to control circuit 206 at step 303. At step 304, control circuit 206 sets the various operating parameters of the paging apparatus to the test mode, and at step 305, erases all of the message codes previously stored in message memory 211. After this, at step 306, control circuit 206 performs a test reception control operation. Only the message codes received during the test mode are stored in message memory 211. As a result, factory personnel performing the test of the paging apparatus may accurately evaluate the message codes received during the test without any possibility of these message codes being mixed with message codes previously stored in message memory 211. It is contemplated that, during the test, a series of test messages would be generated and received by the paging apparatus, and the responsiveness of the paging apparatus to these test messages would be evaluated.

When factory testing is completed, the test jig or the like again would be used to switch the position of test switch 212 from the test mode to the normal mode. When this operation is detected by detection circuit 213, detection circuit 213 sends a detection signal to control circuit 206. Thereupon, at step 307, control circuit 206 terminates the test mode. At step 308, all the message codes previously stored in message memory 311 during the test mode are erased by memory erasure function 2064 of control circuit 206. Then, at step 309, the operating mode of the pager is reset to the normal mode from the test mode, and the paging apparatus returns to a standby state at steps 301, 302 and 303 as described above. Consequently, no unwanted message codes stored in message memory 211 during the test mode are left behind, and a user of the paging apparatus is not subject to the inconvenience of possibly confusing messages stored during the test mode with messages received thereafter.

Accordingly, in the above described embodiment of the present invention, when the position of test switch 212 changes, the message codes stored in message memory 211 are automatically erased. This prevents the test messages from being confused with messages received in the normal mode during or after the test mode, and also prevents a user from confusing test messages with user messages. Furthemore, message codes are erased from message memory 211 without removing and remounting the battery. This reduces the trouble associated with the test mode, thereby shortening the test period. Testing efficiency thus may be greatly increased, and an accurate test may be carried out.

This invention is not restricted to the above-described embodiment. For example, during the test mode, prior to erasing the contents of the message memory, it is possible to display on the display device a message confirming whether to erase the contents of the message memory. This may be accomplished by providing another switch position for the test switch. Also, after erasure of the message memory, an indication could be provided on the display device that erasure of the message memory has been accomplished.

This invention has been described in connection with the preferred embodiments, but these embodiments are merely for example only, and the invention should not be construed as limited thereto. It should be apparent to those skilled in the art that other variations or modifications can be made therein without departing from the spirit or scope of the invention.

We claim:

1. A Paging apparatus responsive to paging signals broadcast over at least one radio channel and having a test mode wherein the paging apparatus receives paging signals transmitted from a test transmission device and a normal mode wherein the paging apparatus receives paging signals transmitted from a base station, the paging signals containing identification numbers identifying a particular paging apparatus and at least a message signal, said paging apparatus comprising:

receiving means for receiving the paging signals;

storage means for storing at least one identification number identifying the paging apparatus;

signal detecting means coupled to said storage means for detecting in the received paging signals a paging signal having an identification number corresponding to the identification number stored in said storage means, said signal detecting means further detecting at least one message signal addressed to the paging apparatus in the received paging signal;

message memory means coupled to said signal detecting means for storing the detected message signal;

a manually operable switch for setting the paging apparatus in the test mode wherein the paging apparatus receives paging signals transmitted from a test transmission device or the normal mode wherein the paging apparatus receives paging signals transmitted from a base station; and erasure means coupled to said message memory means and said manually operable switch for erasing the message stored in said message memory means in response to setting the paging apparatus in the test mode or the normal mode by the actuation of said manually operable switch.

2. The paging apparatus according to claim 1 further including battery means connected to at least said message memory means for supplying power directly to said message memory means upon mounting said battery means in the paging apparatus, said battery means being removable from the paging apparatus.

3. The paging apparatus of claim 1 further including display means for displaying the detected message signal upon correspondence between the identification number in the received paging signal and the identification number stored in said storage means.

4. The paging apparatus according to claim 1 wherein said manually operable switch is a test switch mounted within the paging apparatus in a position inaccessible to the user of the paging apparatus in the normal operational mode.

5. A paging apparatus having a first mode wherein the paging apparatus receives paging signals transmitted from a first transmission device over a radio channel and a second mode wherein the paging apparatus receives paging signals transmitted from a second transmission device over a radio channel, the paging signals containing identification numbers identifying a particular paging apparatus and at least a message signal, said paging apparatus comprising:

storage means for storing at least one identification number identifying the paging apparatus;

signal detecting means coupled to said storage means for detecting in the received paging signals a paging signal having an identification number corresponding to the identification number stored in said storage means, said signal detecting means further detecting at least one message signal addressed to the paging apparatus in the received paging signals;

message memory means coupled to said signal detecting means for storing the detected message signal;

a manually operable switch for setting the paging apparatus to the first mode or the second mode;

control means for controlling said message memory means so that the messages stored in said message memory means are erased in response to setting the paging apparatus to the first mode or the second mode by the actuation of said manually operable switch.

6. The paging apparatus according to claim 5 wherein the apparatus is powered by a battery upon the mounting and connection of the battery to the paging apparatus.

* * * * *